(12) United States Patent
Scott

(10) Patent No.: US 7,178,866 B1
(45) Date of Patent: Feb. 20, 2007

(54) OPEN-AIR VEHICLE SEATS WITH EMBEDDED HEATING ELEMENTS

(76) Inventor: Steven J. Scott, 1977 Route 206 South, Southampton, NJ (US) 08088

( * ) Notice: Subject to any disclaimer, the term of this patent is extended or adjusted under 35 U.S.C. 154(b) by 0 days.

(21) Appl. No.: 11/316,652

(22) Filed: Dec. 22, 2005

(51) Int. Cl.
*A47C 7/72* (2006.01)
(52) U.S. Cl. .............................. 297/180.12; 297/195.1
(58) Field of Classification Search ............. 297/217.3, 297/180.12, 195.1
See application file for complete search history.

(56) References Cited

U.S. PATENT DOCUMENTS

| 5,002,335 | A  | * | 3/1991 | Bengtsson | 297/180.12 |
| 6,386,633 | B1 | * | 5/2002 | Newton | 297/284.1 |
| 6,988,770 | B2 | * | 1/2006 | Witchie | 297/180.14 |
| 2002/0185483 | A1 | * | 12/2002 | Check et al. | 219/217 |

* cited by examiner

*Primary Examiner*—Milton Nelson, Jr.

(57) ABSTRACT

An open-air vehicle seat for a motorcycle, a snowmobile, or an all terrain vehicle etc. is provided which enables a vehicle operator to turn on or off a plurality of heating elements embedded in a multi-layer seat cover on top of the vehicle seat.

9 Claims, 7 Drawing Sheets

OPEN-AIR VEHICLE SEATS WITH EMBEDDED HEATING ELEMENTS

FIELD OF THE INVENTION

The present invention that generally relates to a vehicle seat member and more particularly, relates to open-air vehicle seats that are equipped with embedded heating elements.

BACKGROUND OF THE INVENTION

Heated seats have been used for a long time in automobiles such as cars and trucks. The heated seats are conventionally designed to operate in vehicles with enclosed environment and therefore the control of temperature of the heated seats is much simpler to achieve.

In recent years, recreational vehicles such as snowmobiles, motorcycles, all terrain vehicles have become very popular to the general public. These vehicles, especially the snowmobiles and the all terrain vehicles tend to be operated in adverse weather conditions such as in extremely cold climate and in snowy weather. In order to improve the comfort of the driver of such vehicles, the capability of heating the vehicle seats becomes very important. Even in the case of motorcycles, which does not operate under extremely adverse conditions, such as those of snowmobiles, when operated at high speed, the driver experiences low ambient temperature and wind chill. It is therefore desirable to provide the capability of heating open-air vehicle seats such that the sporting activities of either motorcycling, snow mobiling can be conducted more comfortably.

It is therefore an object of the present invention to provide open-air vehicle seats with embedded heating elements that do not have the drawbacks or shortcomings of conventional open-air vehicle seats.

It is another object of the present invention to provide open-air vehicle seats for motorcycles, snowmobiles, all terrain vehicles, etc. equipped with embedded heating elements.

It is still another object of the present invention to provide open-air vehicle seats with embedded heating elements that can be turned on or off by the vehicle operator.

It is yet another object of the present invention to provide open-air vehicle seats that has embedded heating elements underlying a top-most layer of a multi-layer seat cover.

SUMMARY OF THE INVENTION

In accordance with the present invention, an open-air vehicle seat that is constructed with embedded heating elements is provided.

In a preferred embodiment, an open-air vehicle seat that is equipped with heaters can be constructed by a seat cushion that includes a seat frame and a foam cushion; a seat cover of multi-layer construction that has a plurality of heating elements embedded underlying a top-most layer of the seat cover; and an on-off switch for turning on/off a power supply to the plurality of heating elements.

BRIEF DESCRIPTION OF THE DRAWINGS

The invention will now be described, by way of example, with reference to the accompanying drawings, in which.

DETAILED DESCRIPTION OF THE INVENTION

The present invention discloses an open-air vehicle seat that is equipped with embedded heating elements such that the heating function of the seat can be easily turned on or off by a switch by the vehicle operator.

The present invention open-air vehicle seat is a heated seat for motorcycles, snowmobiles, all terrain vehicles and other types of open-seated machines. The heated seat feature keeps the vehicle operator warm and comfortable for a more enjoyable travel or sporting experience in cold temperatures. The seat can be sized and shaped for the particular application. It is normally constructed of a resilient internal foam cushion and a leather or high quality vinyl outer surface. Integrated into the seat is a plurality of heating elements that are similar to that used in an electric blanket. The seat heater can be wired to the electrical system of the vehicle and controlled by the vehicle operator with a conveniently located switch, i.e. on the handle bar of the vehicle.

When the open-air vehicle is traveling in cold weather, the control switch can be activated to energize the plurality of heating elements within the seat.

This quickly warms the entire seat to a pre-determined temperature and thereby keeping the vehicle operator warm.

Figure 1:
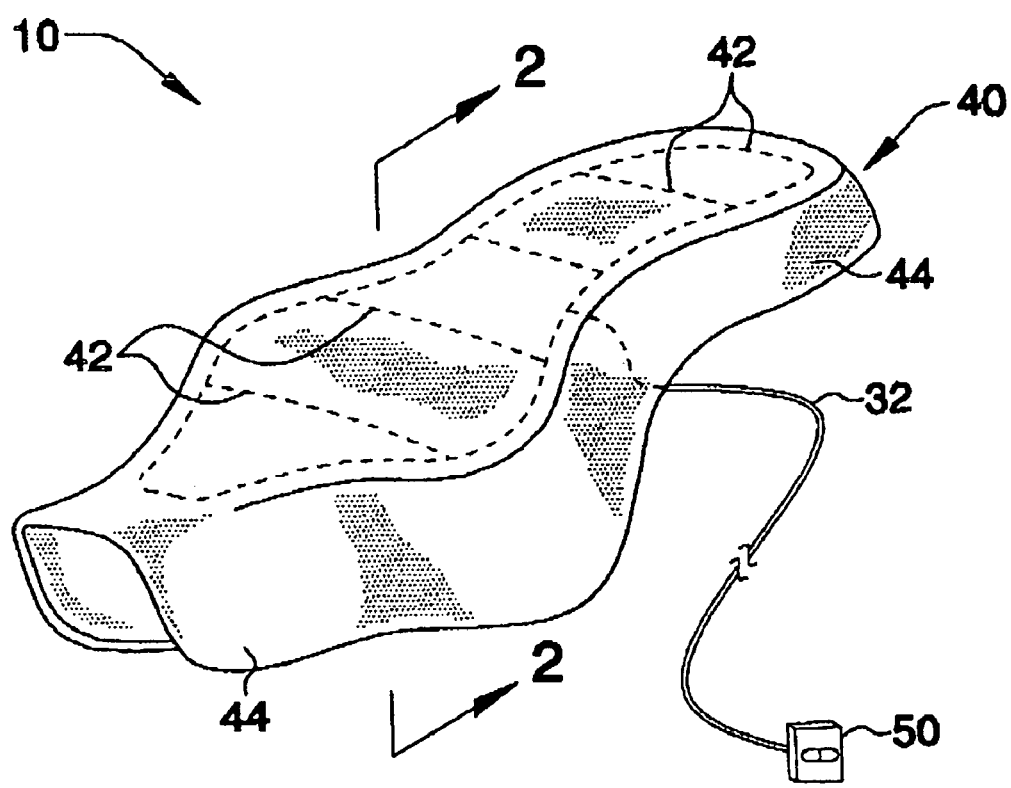
FIG. 1 is a perspective view of the present invention open-air vehicle seat that is equipped with a seat heater.
Figure 2:
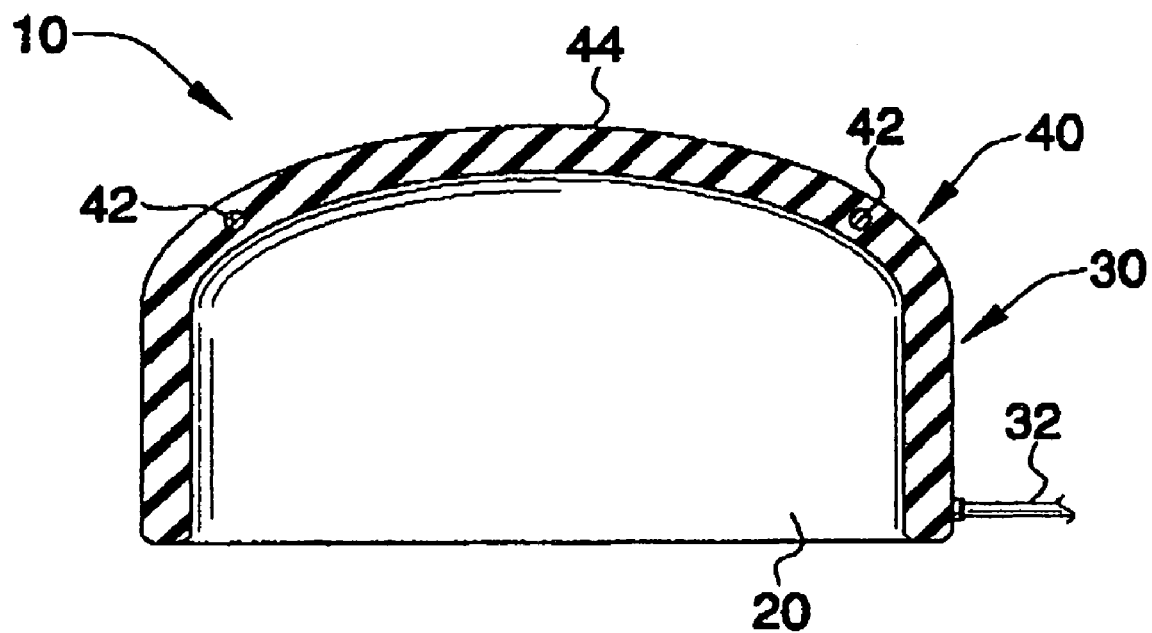
FIG. 2 is a cross-sectional view of the present invention open-air vehicle seat that has embedded heating elements in the seat cover.
Figure 3:
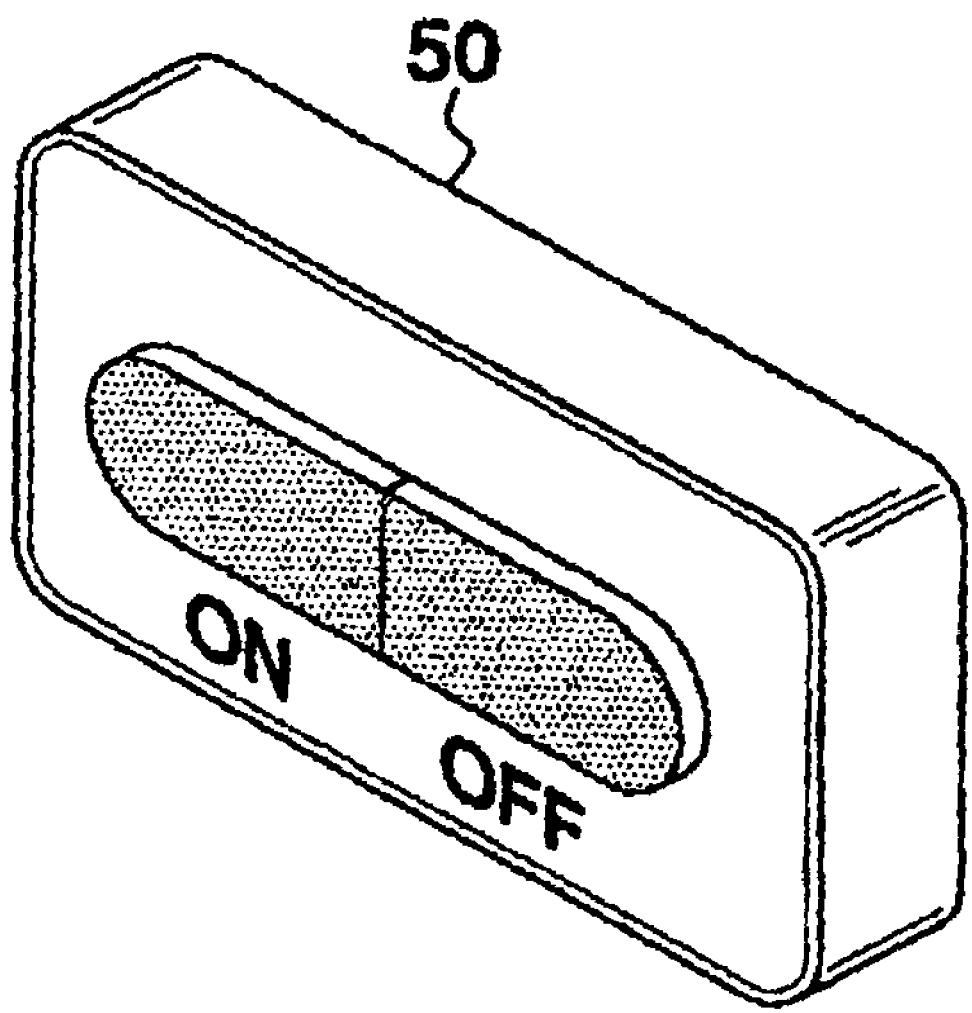
FIG. 3 is a perspective view of an on/off switch for controlling the present invention seat heater.
Figure 5A:
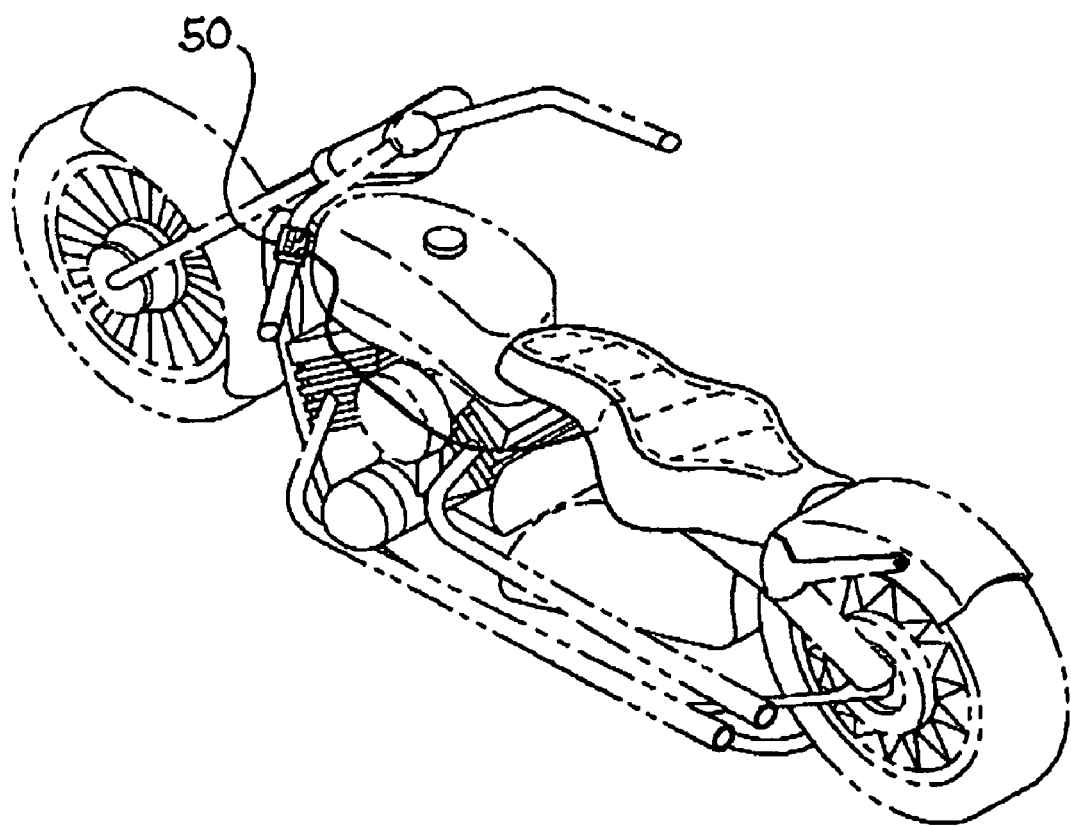
FIGS. 5A–5C are perspective views of various open-air vehicles equipped with the present invention seat heater and an on/off switch mounted on the handlebars.
Figure 5B:
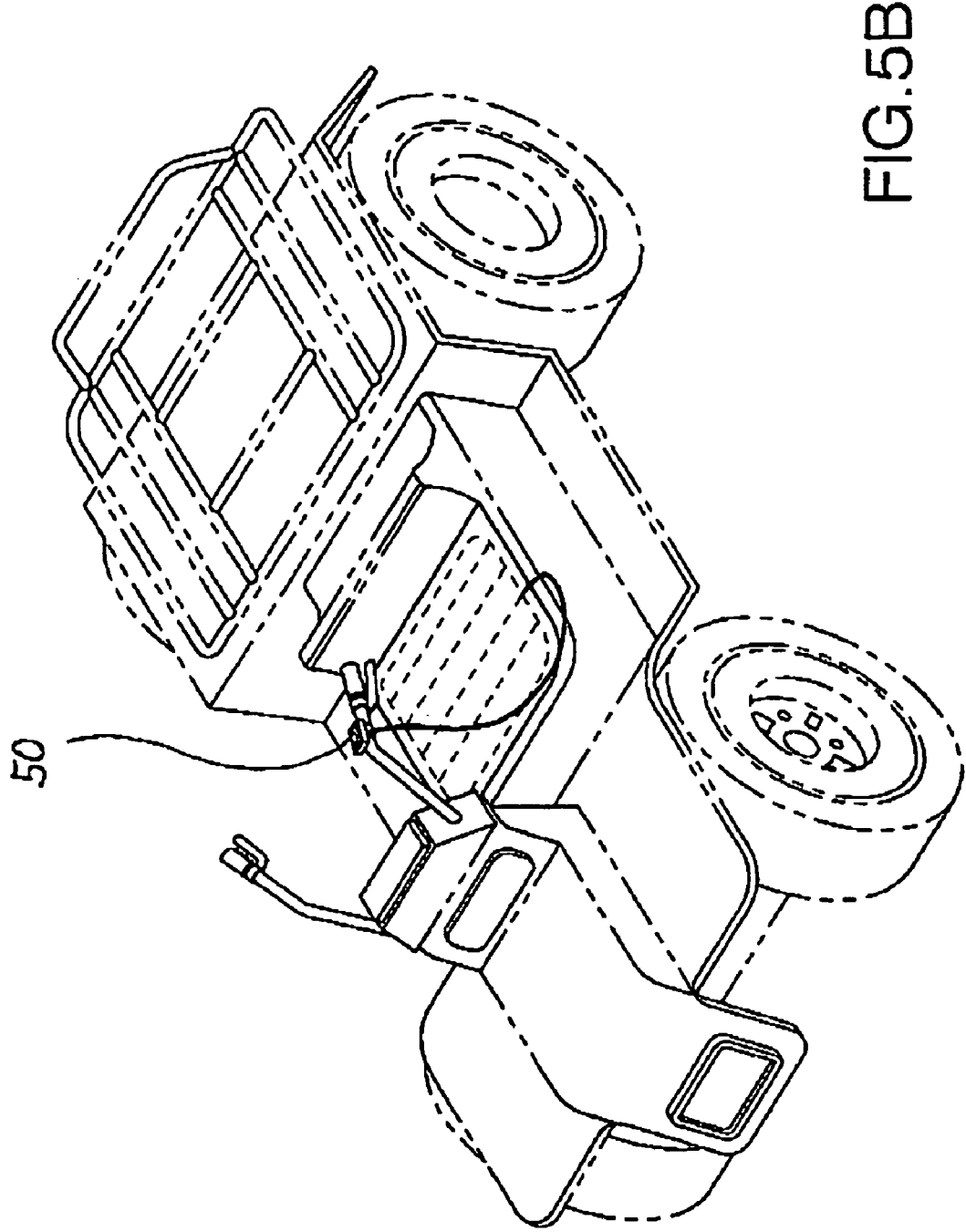
Figure 5C:
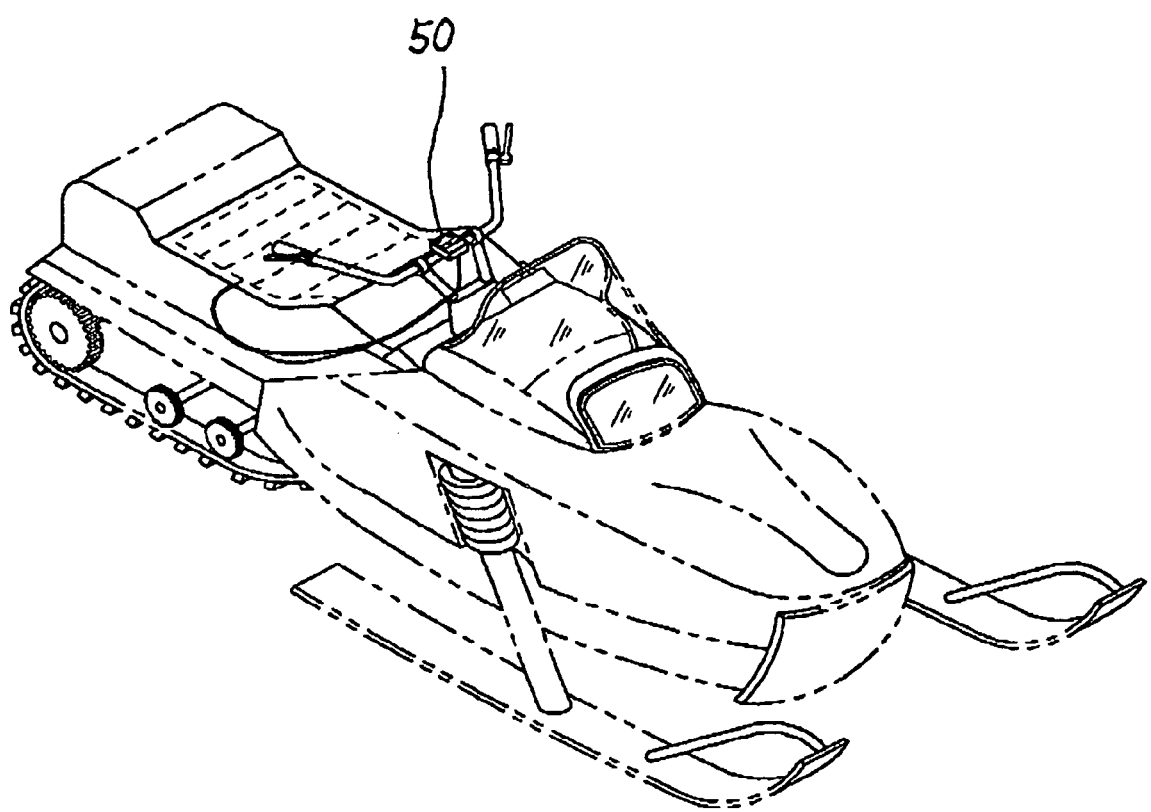

The present invention open-air vehicle seat is comfortable, easy to use and convenient. Instead of suffering in the cold while riding the vehicle, the heated seat can be activated with the control switch. The present invention open-air vehicle seat therefore provide comfortable and enjoyable riding experience by warming the rider in a quick and efficient manner. The vehicle seat may further extend the riding season, thereby maximizing the usage of the motorcycle, the snowmobile, or the all terrain vehicle. The present invention vehicle seat further provides an added measure of safety with the comfortable seat the rider is better able to focus and concentrate on the roadway. In addition, the open-air vehicle seat can be attractively styled, easily applied, and adaptable to different types of open-air equipment. Referring initially to FIG. 1, wherein a present invention open-air vehicle seat 10 is shown. The open-air vehicle seat 10 is constructed of a seat cushion that includes a seat frame 20 and a foam cushion 30 (FIG. 2). A seat cover 40 of multi-layer construction on top of the foam cushion 30 that has a plurality of heating elements 42 embedded underlying a top most layer 44 of the seat cover 40. The plurality of heating elements 42 may be similar to those used in an electric blanket, i.e. of high electrical resistance wiring. An on-off switch 50 for turning on/off a power supply to the plurality of heating elements 42 is further provided. The on/off switch 50 can be advantageously mounted at a location that is easy for the vehicle operator to use. A suitable place for such switch 50 may be on the handle bar of a motorcycle, a snowmobile, or an all terrain vehicle. This is shown in FIGS. 5A–5C.

The wiring 32 is used for such purpose of communicating between the power supply and the plurality of heating elements 42. This is shown in FIG. 2.

Figure 4:
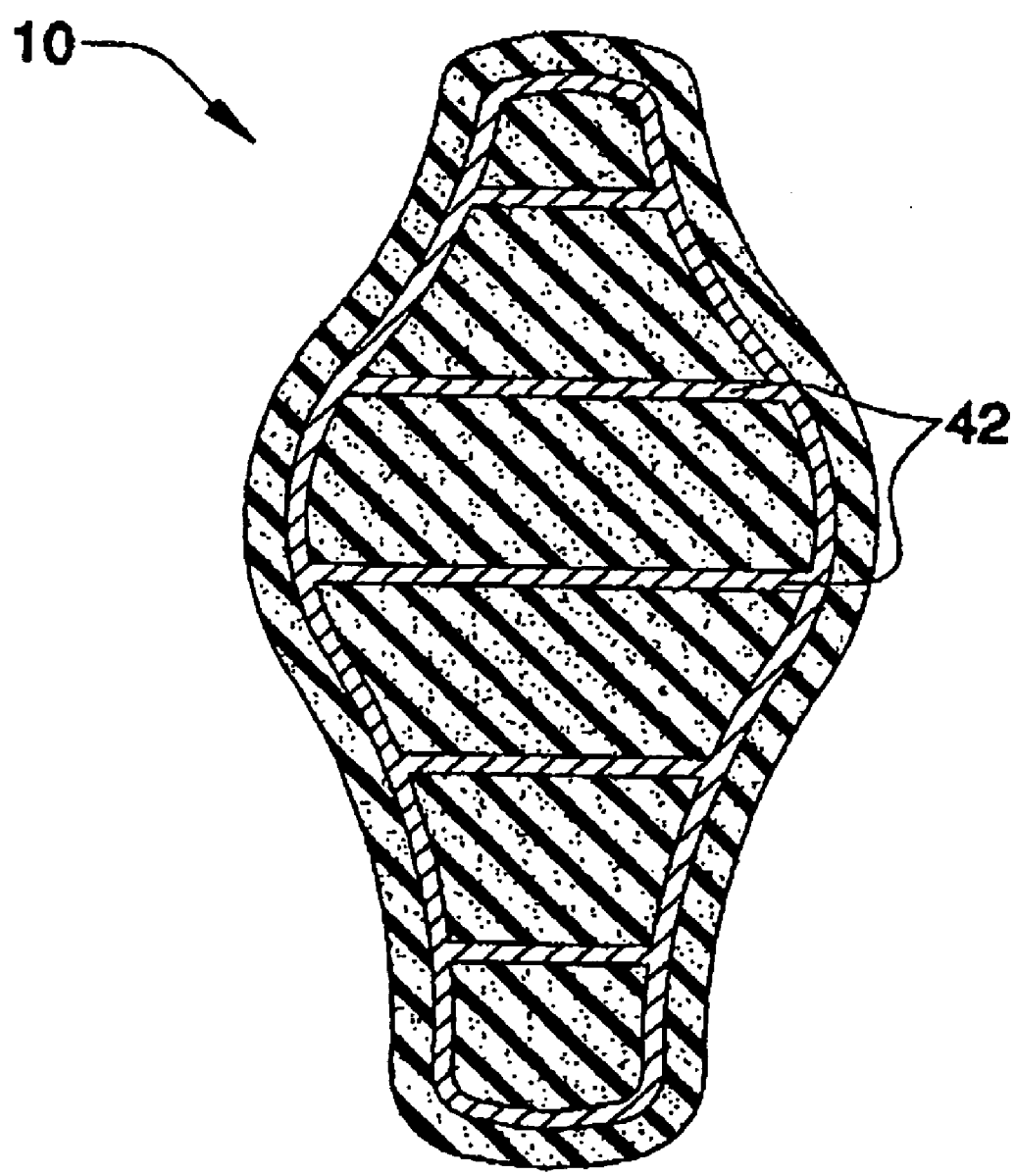
FIG. 4 is a plane view of the present invention open-air vehicle seat equipped with a plurality of heating elements.

A lay out of the plurality of heating elements 42 is shown in a plane view in FIG. 4. It should be noted that the distance between the heating elements and the number of heating elements can all be adjusted depending on the size of the seat and the amount of heat to be generated. It can be suitably adjusted for any type of applications.

While the preferred embodiments of the invention have been described above, it will be recognized and understood that various modifications can be made in the invention and the appended claims are intended to cover all such modifications which may fall within the spirit and scope of the invention.

What is claimed is:

1. An open-air vehicle seat for use with a vehicle comprising:
    a seat cushion comprising a seat frame and a foam cushion;
    a seat cover of multi-layer construction on top of said foam cushion having a plurality of heating elements embedded underlying a top-most layer of said seat cover; and
    an on-off switch for turning on/off a power supply to said plurality of heating elements; said on-off switch is mounted on a handlebar of a vehicle.

2. The open-air vehicle seat according to claim 1, wherein said seat cushion is for a single vehicle rider.

3. The open-air vehicle seat according to claim 1, wherein said seat cushion is for two vehicle riders.

4. The open-air vehicle seat according to claim 1, wherein said seat cover has a top-most layer formed of a vinyl material.

5. The open-air vehicle seat according to claim 1, wherein said seat cover having a top-most layer formed of leather.

6. The open-air vehicle seat according to claim 1, wherein said plurality of heating elements are powered by the vehicle battery.

7. The open-air vehicle seat according to claim 1, wherein said foam cushion is formed of polyurethane foam.

8. The open-air vehicle seat according to claim 1, wherein said seat frame is formed of steel.

9. The open-air vehicle seat according to claim 1, wherein said seat further comprising wiring connecting between said plurality of heating elements and a vehicle battery.

* * * * *